(12) United States Patent
Bandyopadhyay et al.

(10) Patent No.: US 11,268,716 B2
(45) Date of Patent: *Mar. 8, 2022

(54) SMART TRANSDUCER PLUG AND PLAY CONTROL SYSTEM AND METHOD

(71) Applicant: Johnson Controls Technology Company, Auburn Hills, MI (US)

(72) Inventors: Sourav Bandyopadhyay, Liluah (IN); Sushant Trivedi, DDU Marg (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,510

(22) Filed: Mar. 16, 2020

(65) Prior Publication Data

US 2020/0217539 A1   Jul. 9, 2020

Related U.S. Application Data

(63) Continuation of application No. 15/481,174, filed on Apr. 6, 2017, now Pat. No. 10,591,174.

(51) Int. Cl.

| F24F 11/30 | (2018.01) |
| F24F 11/70 | (2018.01) |
| F24F 11/62 | (2018.01) |
| F24F 11/58 | (2018.01) |
| G05B 19/042 | (2006.01) |
| F24F 11/56 | (2018.01) |
| F24F 11/63 | (2018.01) |
| F24F 110/00 | (2018.01) |

(52) U.S. Cl.
CPC .............. *F24F 11/30* (2018.01); *F24F 11/58* (2018.01); *F24F 11/62* (2018.01); *F24F 11/70* (2018.01); *G05B 19/0426* (2013.01); *F24F 11/56* (2018.01); *F24F 11/63* (2018.01); *F24F 2110/00* (2018.01); *G05B 2219/2614* (2013.01)

(58) Field of Classification Search
CPC .. F24F 11/30; F24F 11/56; F24F 11/58; F24F 11/62; F24F 11/70; F24F 11/63; F24F 2110/00; G05B 19/0426; G05B 2219/2614
USPC ........................................................ 700/276
See application file for complete search history.

(56) References Cited

U.S. PATENT DOCUMENTS

| 6,553,336 B1 | 4/2003 | Johnson et al. |
| 7,130,720 B2 | 10/2006 | Fisher |

(Continued)

OTHER PUBLICATIONS

U.S. Appl. No. 62/456,080, filed Feb. 7, 2017, Noboa.

*Primary Examiner* — Chun Cao
(74) *Attorney, Agent, or Firm* — Foley & Lardner LLP

(57) ABSTRACT

A building management system includes a communications bus, field devices connected to the communications bus, a cloud service including a machine learning engine; and a controller for an HVAC device. The controller communicates with the communications bus and the cloud service and is configured to transmit messages through the communications bus to the field devices, compile a list of connected field devices, receive sample data from the connected field devices, and transmit the sample data from the connected field devices to the cloud service. The controller is further configured to receive identifying characteristics for each of the connected field devices from the cloud service and to select a control logic file for the HVAC device based on the identifying characteristics.

20 Claims, 13 Drawing Sheets

(56) References Cited

U.S. PATENT DOCUMENTS

| | | |
|---|---|---|
| 7,373,356 B2 | 5/2008 | Potter et al. |
| 9,581,985 B2 | 2/2017 | Walser et al. |
| 10,591,174 B2 * | 3/2020 | Bandyopadhyay ...... F24F 11/58 |
| 2008/0244104 A1 | 10/2008 | Clemente |
| 2013/0085615 A1 | 4/2013 | Barker |
| 2014/0277765 A1 | 9/2014 | Karimi et al. |
| 2015/0181413 A1 | 6/2015 | Singamsetti et al. |
| 2016/0308473 A1 | 10/2016 | Alexander et al. |
| 2016/0327293 A1 * | 11/2016 | Grabowski .............. F24F 11/30 |
| 2016/0330285 A1 | 11/2016 | Brophy et al. |
| 2017/0159962 A1 | 6/2017 | Walser et al. |
| 2018/0191521 A1 | 7/2018 | Ahmed et al. |
| 2020/0119982 A1 * | 4/2020 | Gottschalk .......... H04L 12/2816 |

\* cited by examiner

SMART TRANSDUCER PLUG AND PLAY CONTROL SYSTEM AND METHOD

CROSS-REFERENCE TO RELATED APPLICATIONS

The present application claims priority to and is a continuation of U.S. patent application Ser. No. 15/481,174 filed Apr. 6, 2017, issued as U.S. Pat. No. 10,591,174, entitled "Smart Transducer Plug And Play Control System And Method," incorporated herein by reference in its entirety.

BACKGROUND

The present disclosure relates generally to building management systems and associated devices and more particularly to a heating, ventilating, or air conditioning (HVAC) controller device for a building management system (BMS) with automatic configuration and machine learning capabilities.

HVAC control systems are used to monitor and control temperature, humidity, air flow, air quality, and/or other conditions within a building or building system. HVAC control systems typically include a plurality of measurement devices (e.g., temperature sensors, pressure sensors, flow sensors, etc.), control devices (e.g., chillers, boilers, air handling units, variable air volume units, etc.), and a controller for receiving feedback from the measurement devices and providing a control signal to the control devices. Some HVAC control systems include a main controller and one or more auxiliary, or subordinate, controllers.

Current HVAC control systems often use fixed point controllers in which the sensors used to measure environmental properties must be individually defined in a controller file and correctly wired to ensure that the control system is receiving sensor data of the expected type and from the expected location. As a result, the control system is unable to accommodate any sensor devices other than those defined in the controller file. Systems and methods to reduce the complexity of the control system installation process and increase the flexibility of the system to accommodate additional sensor devices would be useful.

SUMMARY

One embodiment of the disclosure relates to a building management system. The building management system includes a communications bus, field devices connected to the communications bus, a cloud service including a machine learning engine; and a controller for an HVAC device. The controller communicates with the communications bus and the cloud service and is configured to transmit messages through the communications bus to the field devices, compile a list of connected field devices, receive sample data from the connected field devices, and transmit the sample data from the connected field devices to the cloud service. The controller is further configured to receive identifying characteristics for each of the connected field devices from the cloud service and to select a control logic file for the HVAC device based on the identifying characteristics.

In some embodiments, the field devices include at least one temperature sensor, pressure sensor, or humidity sensor. In some embodiments, the sample data includes at least one of temperature data, pressure data, and humidity data.

In some embodiments, the field devices communicate with the controller via the IEEE 1451.4 TEDS standard.

In some embodiments, an identifying characteristic includes the field device location within the building management system. In some embodiments, the HVAC device is at least one of a fan coil unit, a roof top unit, and an air handling unit. In some embodiments, the cloud service includes a machine learning engine.

In some embodiments, the controller is further configured to modulate an operation of at least one of a cooling coil and a heating coil in response to a message from the cloud service. In other embodiments, the controller is further configured to modulate an operation of a fan in response to a message from the cloud service.

Another embodiment of the present disclosure is a method for controlling an HVAC device. The method includes transmitting messages through a communications bus to field devices connected to the communications bus, compiling a list of connected field devices, receiving sample data from the connected field devices, and transmitting the sample data to a cloud service. The method further includes receiving identifying characteristics for the connected field devices from the cloud service, and selecting a control logic file for the HVAC device based on the identifying characteristics of the connected field devices.

In some embodiments, the field devices include at least one temperature sensor, pressure sensor, or humidity sensor. In some embodiments, the sample data includes at least one of temperature data, pressure data, and humidity data.

In some embodiments, the field devices communicate with the controller via the IEEE 1451.4 TEDS standard.

In some embodiments, the HVAC device is at least one of a fan coil unit, a roof top unit, and an air handling unit. In some embodiments, the cloud service includes a machine learning engine.

In some embodiments, the method further includes modulating an operation of at least one of a cooling coil and a heating coil and modulating an operation of a fan.

Another embodiment of the present disclosure is a method of operating a machine learning engine for a building management system. The method includes designing a sequence of operational steps for HVAC devices connected to a communications bus of the building management system and designing a description algorithm for data received from field devices connected to the communications bus. The description algorithm includes primitive data shapes. The method further includes classifying location data patterns for the field devices. The location data patterns include at least one operational step and at least one primitive data shape.

In some embodiments, the field devices include at least one temperature sensor, pressure sensor, or humidity sensor. In some embodiments, the HVAC device is at least one of a fan coil unit, a roof top unit, and an air handling unit.

In some embodiments, the primitive data shapes include at least one of a linear shape, an exponential shape, a step shape, a peak shape, and a triangle shape.

DETAILED DESCRIPTION

Before turning to the FIGURES, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Overview

Referring generally to the FIGURES, a building management system (BMS) with smart transducer plug and play features is shown, according to some embodiments. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS described herein provides a system architecture that facilitates automatic equipment discovery and control of HVAC equipment. Using transducers that conform to the IEE 1451 smart transducer standard, a primary BMS controller can automatically detect the presence of transducers and actuators connected to a communications bus within the BMS. By interfacing with a cloud service containing a machine learning engine and by utilizing machine learning techniques, the locations and types of transducers and actuators may be identified and a configuration file for HVAC equipment within the BMS may be generated.

Building Management System and HVAC System

Figure 1:
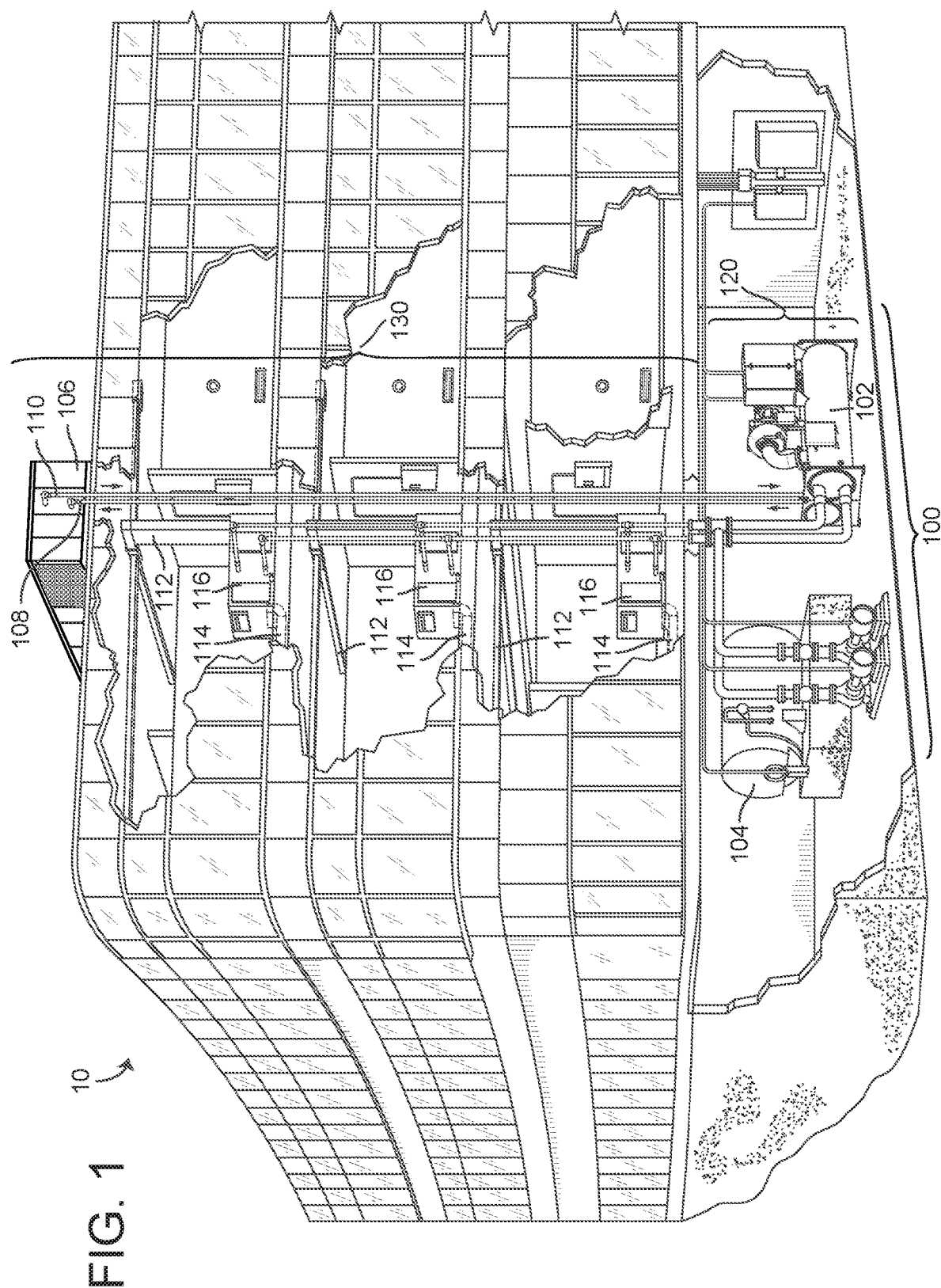
FIG. 1 is a drawing of a building equipped with a heating, ventilating, or air conditioning (HVAC) system and a building management system (BMS), according to some embodiments.

Referring now to FIGS. 1-4, an exemplary building management system (BMS) and HVAC system in which the systems and methods of the present invention can be implemented are shown, according to some embodiments. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
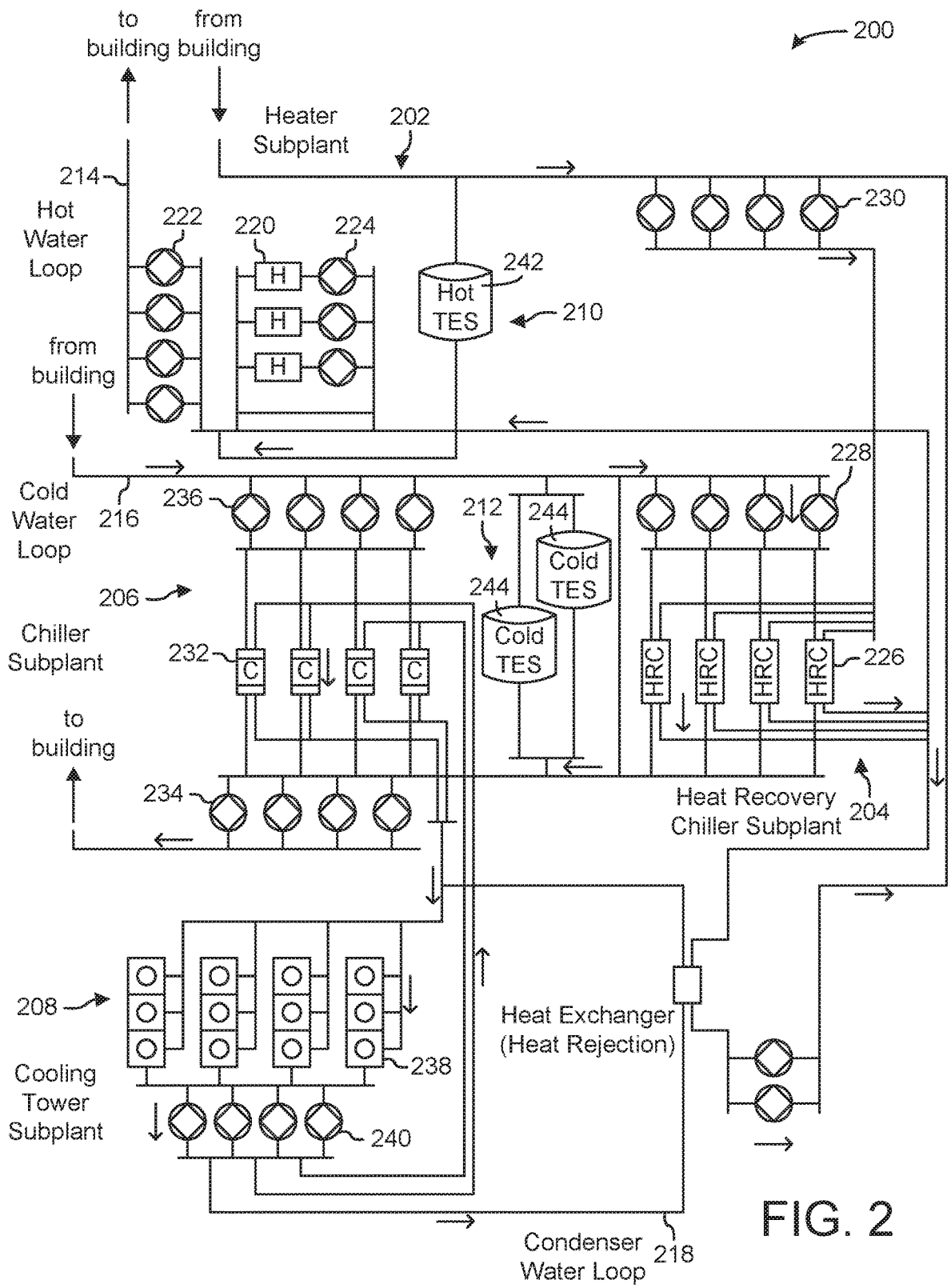
FIG. 2 is a schematic diagram of a waterside system that can be used to support the HVAC system of FIG. 1, according to some embodiments.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
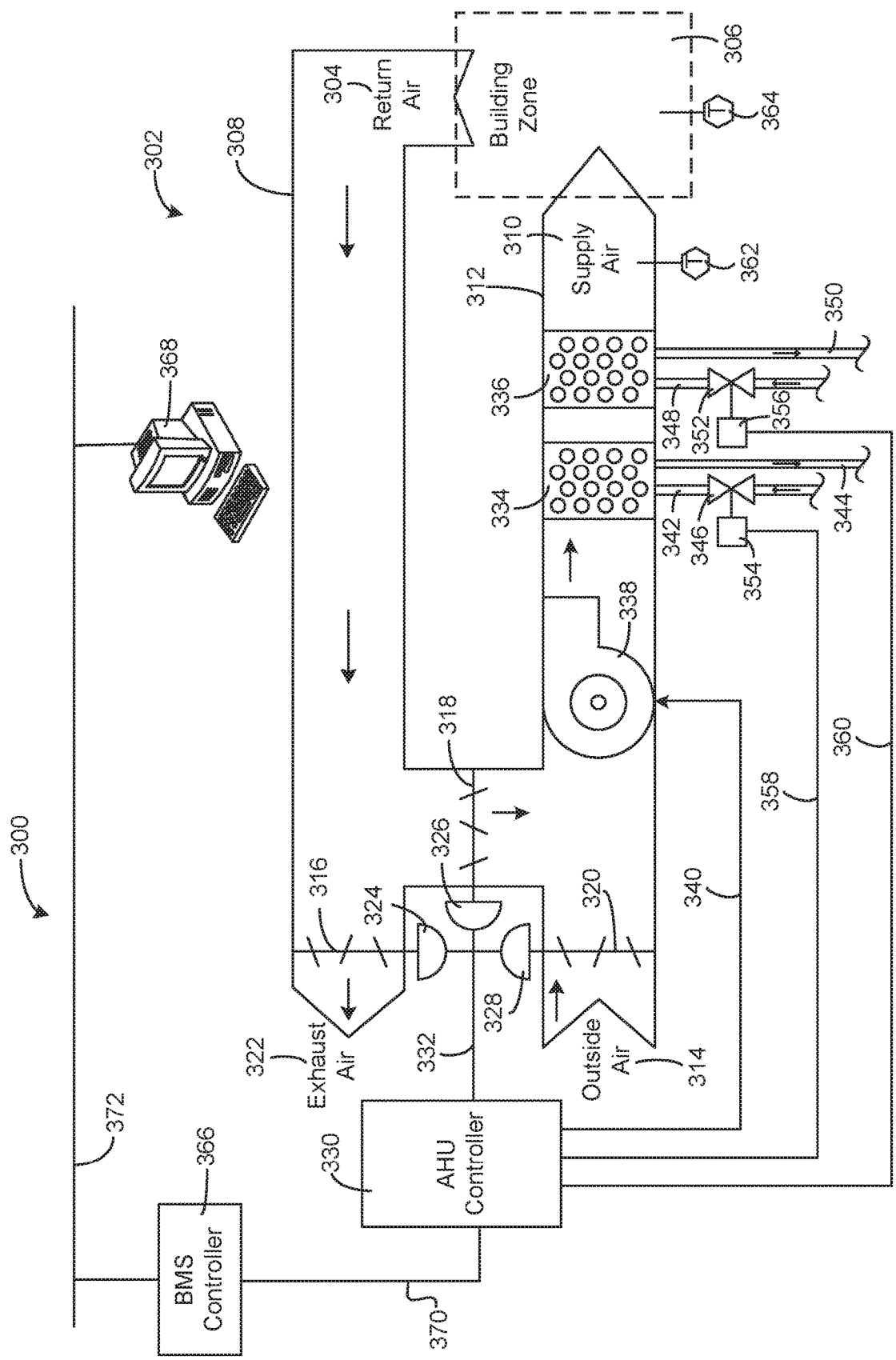
FIG. 3 is a block diagram of an airside system that can be used as part of the HVAC system of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
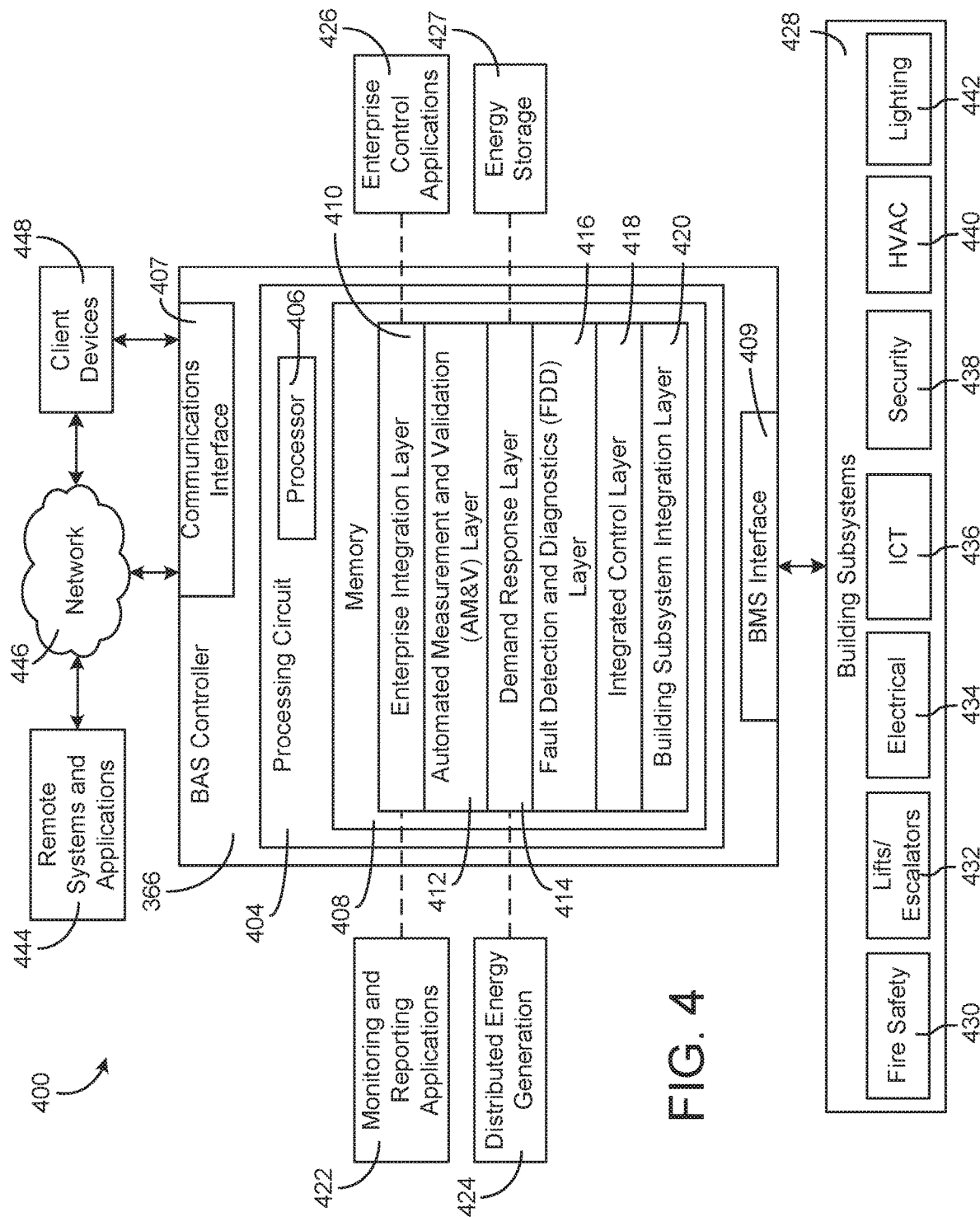
FIG. 4 is a block diagram of a BMS that can be implemented in the building of FIG. 1, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include and number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 may include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Smart Transducer Plug and Play System

Figure 5:
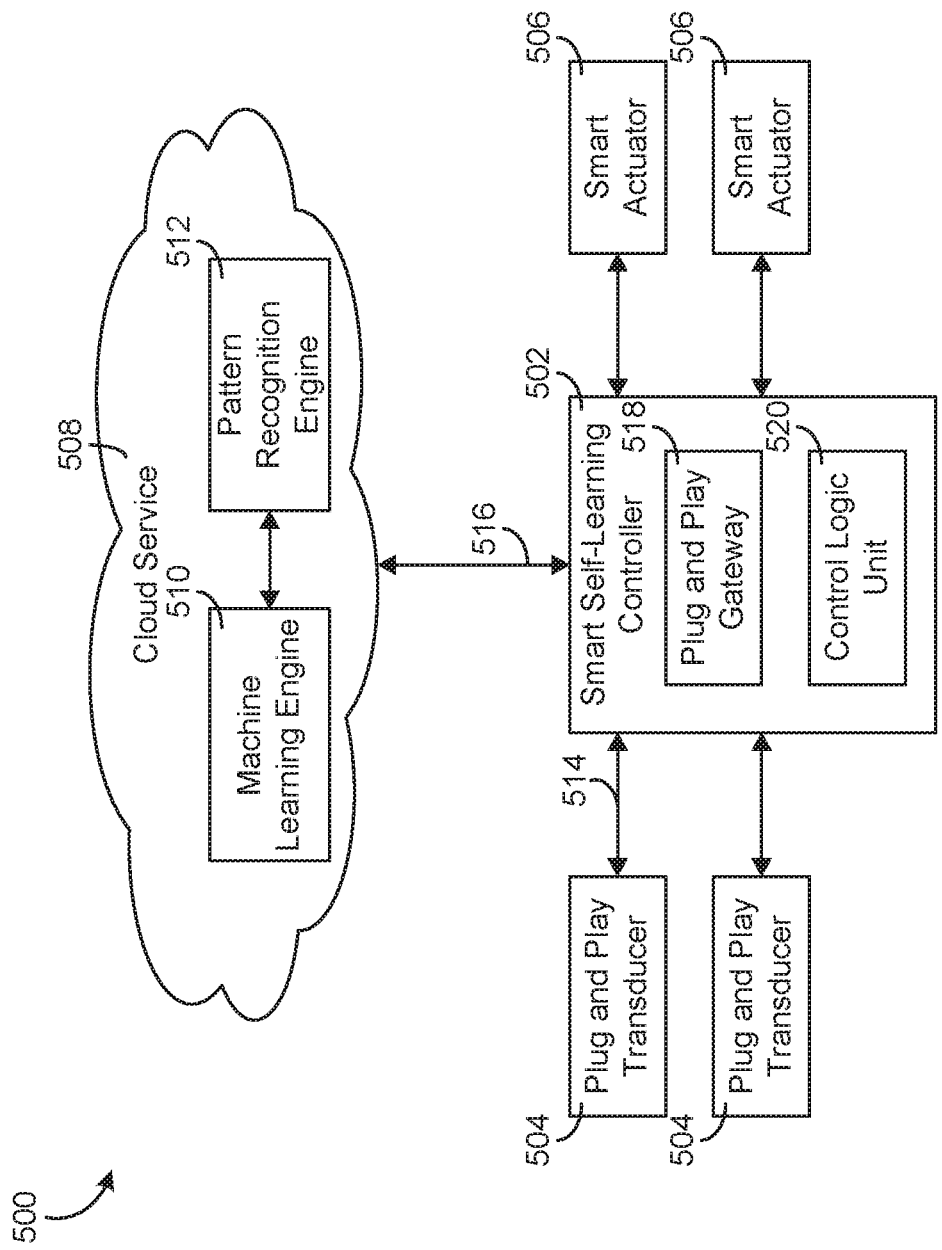
FIG. 5 is a block diagram of a smart transducer plug and play system that can be implemented in the building of FIG. 1, according to some embodiments.

Referring now to FIG. 5, a block diagram of plug and play system 500 is shown, according to some embodiments. In some embodiments, plug and play system 500 is a component of HVAC system 100. System 500 is shown to include, among other components, smart self-learning controller 502, plug and play transducers 504, smart actuators 506, and cloud service 508. Controller 502 may be communicably connected to plug and play transducers 504 and smart actuators 506 via communications bus 514. Controller 502 may also be communicably connected to cloud service 508 via wired or wireless connection 516.

In various embodiments, smart self-learning controller 502 may be the same or substantially similar to the BMS controller 366 described above with reference to FIGS. 3 and 4. However, smart self-learning controller 502 is further shown to include a plug and play gateway 518. In various embodiments, plug and play gateway 518 may be configured to communicate with connected field devices (e.g., transducers 504, smart actuators 506), receive and store data from the connected field devices, and interface with components (e.g., machine learning engine 510) of cloud service 508. Smart self-learning controller 502 may communicate with cloud service 508 via a WiFi or Ethernet-based communications link. For example, plug and play gateway 518 may include an Ethernet card and port or a WiFi transceiver configured to transmit and receive data from cloud service 508.

Smart self-learning controller 502 is further shown to include a control logic unit 520. Control logic unit 520 may be configured to determine control strategies and transmit control signals to connected HVAC devices (e.g., AHU 106, cooling coil 334, heating coil 336, fan 33) based on device recognition and classification data received from machine learning engine 510. For example, in some embodiments, the logic selected to control the HVAC devices of system 500 is dependent on the number, locations, and types of field devices connected to system 500 and recognized by machine learning engine 510.

Plug and play controller system 500 is further shown to include plug and play transducers 504 and smart actuators 506. Transducers 504 and actuators 506 may represent a plurality of field devices connected to controller 502 by communications bus 514. In various embodiments, transducers 504 and actuators 506 may communicate with controller 502 via any suitable wired or wireless means (e.g., Wi-Fi, Bluetooth, or ZigBee wireless technologies). An exemplary plug and play transducer is described in more detail below with reference to FIG. 6. Smart actuators 506 may be configured to operate valves within HVAC system 100, waterside system 200, airside system 300. For example, smart actuators 506 may be damper actuators, valve actuators, fan actuators, pump actuators, or any other type of actuator that can be used in an HVAC system or BMS. In various embodiments, smart actuators 506 may be linear actuators (e.g., linear proportional actuators), non-linear actuators, spring return actuators, or non-spring return actuators.

Cloud service 508 may be any application or computer system configured to communicate with smart self-learning controller 502 and complete data analysis and machine learning functions. In some embodiments, cloud service 508 is hosted at a remote location relative to HVAC system 100. Cloud service 508 is shown to include machine learning engine 510 and pattern recognition engine 512. Machine learning engine 510 may be configured to perform a variety of processes, including the recognition and classification of connected field devices, the optimization of these recognition and classification processes, and generation of a controller application file (e.g., a .caf file) for an HVAC device. Pattern recognition engine 512 may be communicably connected to machine learning engine 510 and may be configured to aid machine learning engine 510 in the recognition and classification of connected field devices via the comparison of sample field device data and stored test data. For example, pattern recognition engine 510 may store test data (e.g., patterns, plots) used to identify the locations of plug and play transducers 504. These recognition and classification processes are described in greater detail with respect to FIGS. 7-10 below, while examples of sample and test data plots are described with reference to FIGS. 11-12B.

Figure 6:
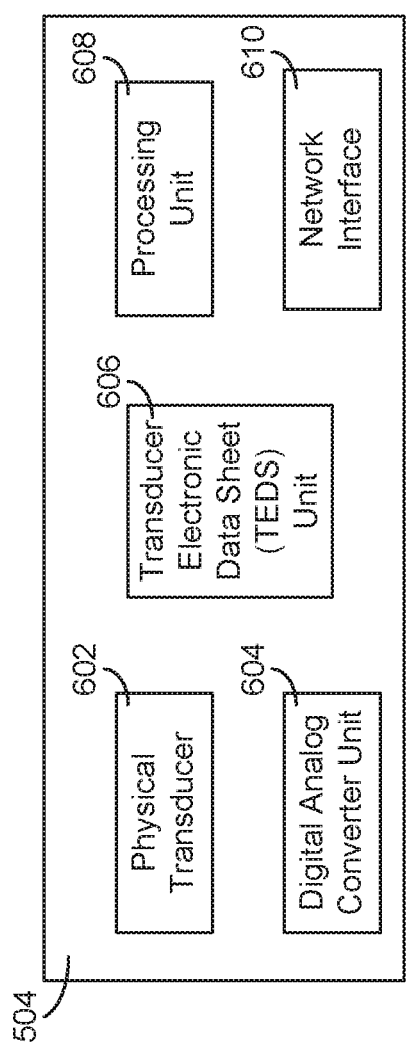
FIG. 6 is a block diagram of a plug and play transducer that can be implemented in the smart transducer plug and play system of FIG. 5, according to some embodiments.

Referring now to FIG. 6, a block diagram of plug and play transducer 504 in greater detail is shown, according to some embodiments. Plug and play transducer 504 is shown to include, among other components, a physical transducer 602, a digital analog converter unit 604, a transducer electronic data sheet unit (TEDS) 606, a processing unit 608, and a network interface 610.

Physical transducer 602 may be configured to measure a physical property of the building. For example, in various embodiments, physical transducer 602 may be configured to measure the temperature, pressure, or humidity of air or fluid passing through the building (e.g., via HVAC system 100, waterside system 200, airside system 300). In some embodiments, physical transducer 602 is configured to output the measured property via an analog signal. Digital analog converter unit 604 may be configured to convert the analog input signal from physical transducer 602 into a digital output signal that may be formatted by TEDS unit 606 and eventually transmitted to smart self-learning controller 502 and cloud service 508.

Plug and play transducer 504 is further shown to include TEDS unit 606. TEDS unit 606 may be configured to receive and format digital input from digital analog converter unit 604 into a standard that may be received by smart self-learning controller 502. In some embodiments, TEDS unit 606 may be configured to format the digital input according to the IEEE 1451.4 standard. The IEEE 1451.4 standard is a standard for adding plug and play capabilities to analog transducers. Specifically, IEEE 1451.4 defines a method of encoding information in a transducer electronic data sheet (TEDS) as a series of multiple sections chained together. The first section (e.g., the first 64 bits) may be the Basic TEDS, which comprises essential identification information, including a manufacturer ID, a model number, a version letter, a version number, and a serial number of the device. Typically, the second section is an IEEE standard template that defines the important properties for the particular sensor type. Finally, the end section of the TEDS is specified as an open user area.

Processing unit 608 may be configured to store device information used to identify transducer 504 to self-learning controller 502. For example, this information may include information used in the TEDS (e.g., the manufacturer ID, the model number, the serial number). In some embodiments, processing unit 608 is also configured to receive and implement control signals from controller 502. Network interface 610 may be configured to connect plug and play transducer 504 to a BMS network (e.g., communications bus 514). As described above, transducer 504 may be connected to self-learning controller 502 via any suitable wired or wireless means.

Figure 7:
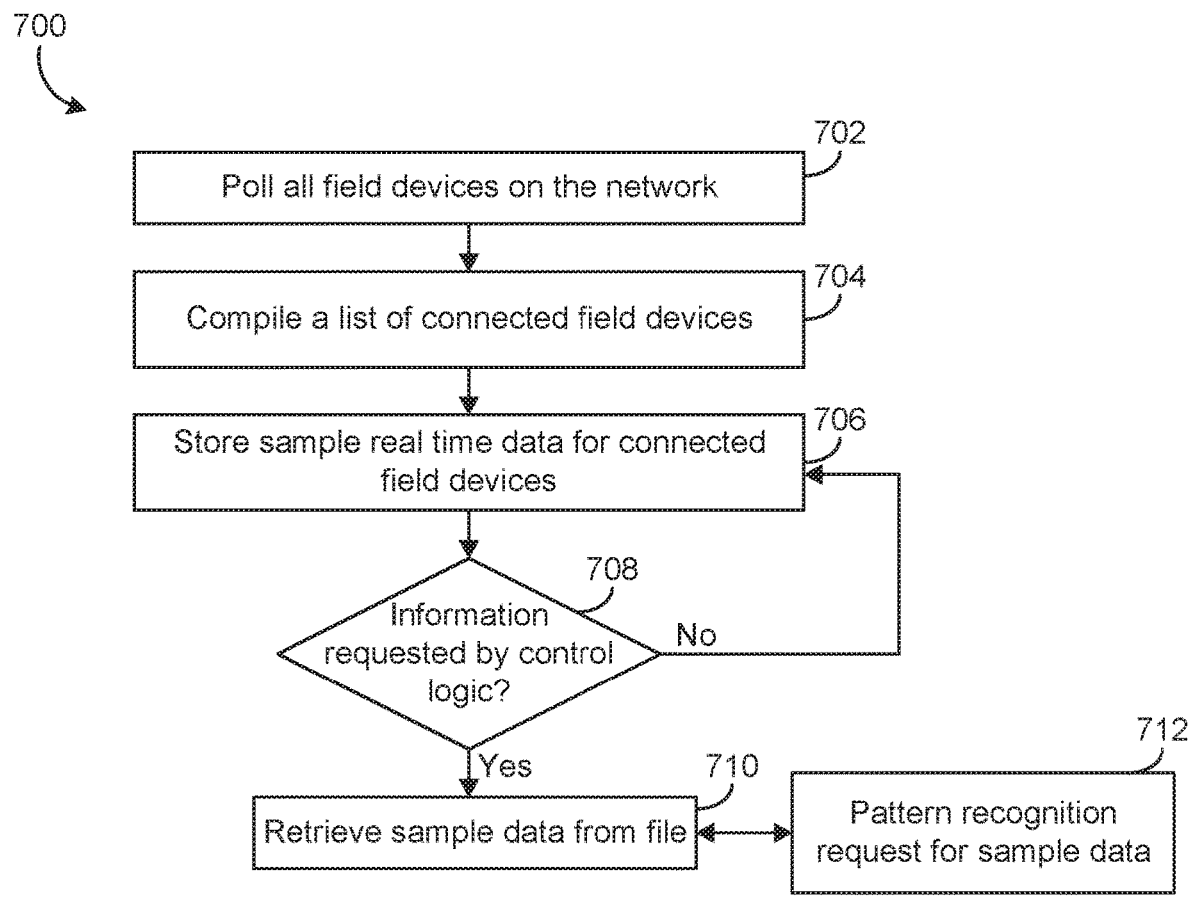
FIG. 7 is a flow diagram of a method of identifying field devices connected to a controller in the smart transducer plug and play system of FIG. 5, according to some embodiments.

Referring now to FIG. 7, a flow diagram of a process 700 for identifying field devices connected to a controller is shown, according to some embodiments. In various embodiments, process 700 may be performed by one or more components of plug and play controller system 500 described above with reference to FIG. 5. Process 700 may begin with step 702, in which self-learning controller 502 polls all field devices (e.g., plug and play transducers 504, smart actuators 506) connected to and communicating on the building network via communications bus 514. In some embodiments, polling the field devices may include controller 502 transmitting a message querying whether the field device is connected to communications bus 514 and waiting to receive responses to the polling messages. In some embodiments, the field devices may transmit TEDS in response to the polling messages.

At step 704, controller 502 compiles a list of connected field devices that transmitted a response message or TEDS in response to the query message of step 702. In some embodiments, this list may be stored in a file in plug and play controller gateway 518. Continuing with step 706, controller 502 collects sample data (e.g., temperature, pressure, or humidity measurements) from the connected field devices. For example, controller 502 may store a maximum of 1000 real time data samples from each connected field device. In some embodiments, this sample data is transmitted to controller 502 in a data format of [SAMPLE VALUE, TYPE OF SENSOR, ADDRESS]. In various embodiments, the data may be stored in a file within plug and play controller gateway 518. As described in further detail below, in some embodiments, controller 502 may operate various HVAC devices (e.g., AHU 106, cooling coil 334, heating coil 336, fan 33) and/or smart actuators 506 to vary the physical conditions of the building while sample data is recorded.

At step 708, controller 502 determines whether control logic unit 520 is requesting the stored sample data from the connected field devices. In some embodiments, control unit 520 may utilize the stored sample data to determine a control strategy for HVAC devices (e.g., AHU 106, cooling coil 334, heating coil 336, fan 33) and/or smart actuators 506. If control logic unit 520 is not requesting the sample data, process 700 reverts to step 706 and continues to store the sample data. However, if control logic unit 520 is requesting the sample data, process 700 proceeds to step 710 and plug and play controller gateway 518 retrieves the sample data file. Plug and play controller gateway 518 may also retrieve the sample data file if it is requested (e.g., by machine learning 510) at step 712 for the purpose of performing a sample data pattern recognition process. Further details of this pattern recognition process are provided below with reference to FIGS. 8-10.

Figure 8:
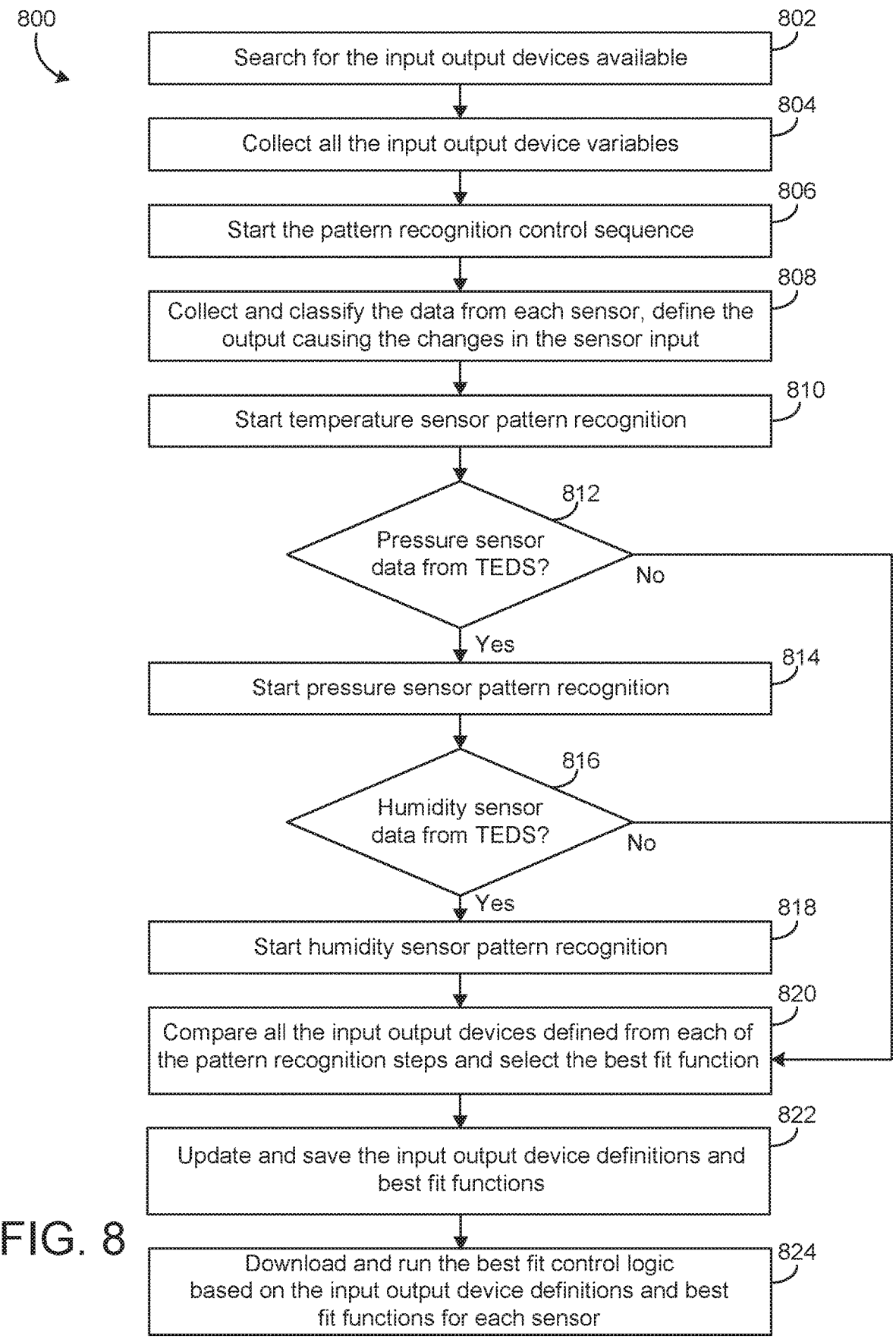
FIG. 8 is a flow diagram of another method of identifying field devices connected to a controller in the smart transducer plug and play system of FIG. 5, according to some embodiments.

Referring now to FIG. 8, a flow diagram of a process 800 for determining control logic for connected field devices is shown, according to some embodiments. Process 800 may be performed by one or more components of plug and play controller system 500 described above with reference to FIG. 5. Specifically, process 800 may be performed by smart self-learning controller 502 and machine learning engine 510 of cloud service 508. Process 800 may commence with step 802, in which controller 502 searches for all connected input output devices (i.e., field devices) connected to communications bus 514. In various embodiments, each input output device may communicate with controller 502 on a separate communications port, and controller 502 may store port assignment information for each input output device within plug and play gateway 518. In some embodiments, step 802 is identical or substantially similar to step 702 of process 700.

At step 804, controller 502 collects input output device variables (e.g., via device information contained in the TEDS) from the input output devices discovered in step 802. For example, an input output device variable may include a property the sensor is configured to measure (e.g., temperature, humidity, pressure). In various embodiments, input output device variable data may be stored in plug and play gateway 518 with the port assignment information discovered in step 802. Continuing with step 806, machine learning engine 510 may begin a pattern recognition control sequence. In some embodiments, step 806 may comprise machine learning engine 510 requesting input output device variable data, and controller 502 transmitting the input output device variable data in response to the request.

Once the device variable data has been received by machine learning engine 510, process 800 continues with step 808, in which sample data is collected from each input field device detected in step 802. In some embodiments, step 808 includes machine learning engine 510 directing controller 502 to operate certain HVAC devices (e.g., AHU 106, fan 33) and/or certain output field devices (e.g., smart actuators 506) while data is collected. For example, machine learning engine 510 may direct controller 502 to operate AHU 106 and fan 33 at their minimum settings while changing the positions of smart actuators 506. As the positions of the smart actuators 506 are changing, controller 502 may collect real time sample data from plug and play transducers 504 and transmit the sample data to machine learning engine 510.

At step 810, machine learning engine 510 may start a temperature sensor pattern recognition program. Once the sample temperature data from plug and play transducers 504 is received by the cloud service 508, machine learning engine 510 may communicate with the pattern recognition engine 512 to compare the sample data with test data stored in pattern recognition engine 512. In some embodiments, comparison of the sample and test data permits machine learning engine 510 to define the location of a plug and play transducer 504 within HVAC system 100 (e.g., whether the transducer 504 is located in a discharge, return, or mixed air stream). In some embodiments, the comparison of sample and test data and subsequent identification of transducer locations is accomplished using regression learning techniques (e.g., using a programming language such as Python). Examples of data plots are described below with reference to FIGS. 11-12B.

After the temperature sensor pattern recognition program is completed, at step 812, machine learning engine 510 may determine whether TEDS data received from controller 502 indicates that a pressure sensor field device is connected to communications bus 514. If TEDS data indicates that no pressure sensor field device is connected, process 800 may advance to step 820. However, if TEDS data does indicate that a pressure sensor device is connected, process 800 continues to step 814, where machine learning engine 510 begins analyzing pressure sensor data from plug and play transducers 504 relative to test data stored in pattern recognition engine 512. This process may be substantially similar to the temperature pattern recognition process performed in step 810.

Continuing with step 816, once the pressure sensor pattern recognition program is completed, machine learning engine 510 may determine whether TEDS data received from controller 502 indicates that a humidity sensor field device is connected to communications bus 514. If TEDS data indicates that no humidity sensor field device is connected, process 800 may advance to step 820. However, if TEDS data does indicate that a humidity sensor device is connected, process 800 continues to step 818, in which machine learning engine 510 may begin analyzing humidity sensor data from plug and play transducers 504 relative to test data stored in pattern recognition engine 512. This process may be substantially similar to the temperature pattern recognition process performed in step 810 and the pressure pattern recognition process performed in step 814.

At step 820, machine learning engine 810 may compare the input output device (i.e., field device) definitions from each of the pattern recognition steps (i.e., step 810, step 814, step 818) and select a best fit function for each input output device. In some embodiments, the best fit function may be a minimum cost function that represents the least resource-intensive method of operating the input output device. In other embodiments, selection of the best fit function may comprise incrementally selecting different control parameters for the HVAC devices (e.g., AHU 106, cooling coil 334, heating coil 336, fan 33) and determining whether the response data from the input output devices (i.e., field devices) matches expected or desired responses. At step 822, machine learning engine 810 may store the definitions (i.e., device locations) and their associated best fit functions in a file within machine learning engine 810. In some embodiments, the definition file may be stored elsewhere within cloud service 508 (e.g., within pattern recognition engine 512).

Process 800 may conclude at step 824 as machine learning engine 510 downloads best fit control logic to controller 502 based on the best fit function determined in step 820. In some embodiments, control logic files may be stored in control logic unit 520 of controller 502 and selected based on the best fit function transmitted from machine learning engine 510. In other embodiments, machine learning engine 510 may transmit a control logic file based on the best fit control function to controller 502 and it may be implemented by control logic unit 520.

Figure 9:
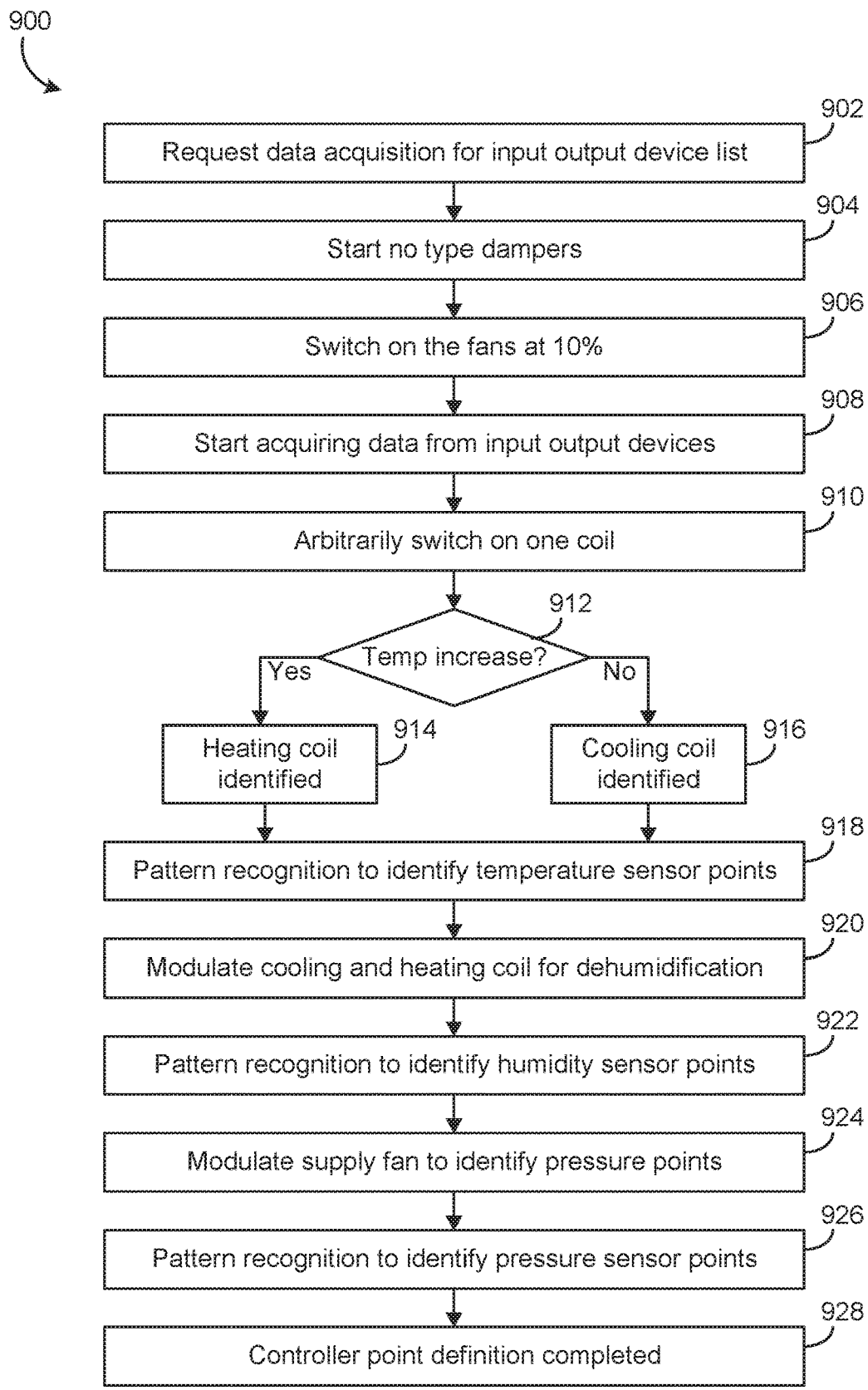
FIG. 9 is a flow diagram of another method of identifying field devices connected to a controller in the smart transducer plug and play system of FIG. 5, according to some embodiments.

Turning now to FIG. 9, a flow diagram of a process 900 for defining controller point locations (e.g., connected field device locations) is shown, according to some embodiments. Process 900 may be performed by one or more components of plug and play controller system 500 described above with reference to FIG. 5. Specifically, process 900 may be performed by machine learning engine 510 and pattern recognition engine 512 of cloud service 508. Process 900 may begin with step 902, in which machine learning engine 510 transmits a request to controller 502 to begin collecting sample data from plug and play transducers 504. At step 904, controller 502 may operate the "no type" dampers (e.g., dampers 316-320). In some embodiments, controller 502 may operate the dampers such that the dampers are in known positions while sample data is collected from transducers 504. At step 906, controller 502 may operate a fan (e.g., fan 33). In some embodiments, controller 502 may operate the fan to a certain speed or percentage of its maximum operating capacity (e.g., 10% of maximum operating capacity).

At step 908, machine learning engine 510 begins receiving sensor measurement data from input output devices (e.g., plug and play transducers 504) routed through controller 502. In some embodiments, this sensor measurement data includes temperature sensor measurements. Continuing with step 910, controller 502 may arbitrarily switch on a heating or cooling coil connected to controller 502, while machine learning engine 510 monitors the response of the received sample temperature data from transducers 504. At step 912, machine learning engine 510 determines if the sample transducer data indicates a temperature increase. If the data indicates a temperature increase, machine learning engine 510 may log that connected coil powered in step 910 is a heating coil (e.g., heating coil 336). If, however, the sample transducer data indicates a temperature decrease, machine learning engine 510 may log that the connected coil is a cooling coil (e.g., cooling coil 334).

At step 918, machine learning engine 510 communicates with pattern recognition engine 512 to identify temperature sensor points. Step 918 may include a comparison of sample temperature data received from the transducers 504 and test transducer data stored within machine learning engine 510 and pattern recognition engine 512. In some embodiments, step 918 is identical or substantially similar to step 810 of process 800 and may include machine learning engine 510 performing a regression analysis.

Continuing with step 920, machine learning engine 510 may instruct controller 502 to modulate the operation of a cooling and/or heating coil (e.g., cooling coil 334, heating coil 336) to modify a humidity condition within HVAC system 100. Based on humidity sensor data received from transducers 504 in response to the modulation of the coils, machine learning engine 510 may perform a humidity sensor pattern recognition process at step 922. In some embodiments, step 922 is identical or substantially similar to step 818 of process 800.

Still referring to FIG. 9, at step 924, machine learning engine 510 may instruct controller 502 to modulate the operation of a supply fan (e.g., fan 33) to modify a pressure condition within HVAC system 100. Based on pressure sensor data received from transducers 504 in response to the modulation of the supply fan, machine learning engine 510 may perform a pressure sensor pattern recognition process at step 926. In some embodiments, step 926 is identical or substantially similar to step 814 of process 800. Process 900 may conclude with step 928, in which the controller point definition may be completed. In various embodiments, step 928 may include storing a controller point definition file within machine learning engine 510 and transmitting the definition file to controller 502. In other embodiments, step 928 may include determining best fit functions and best fit control logic for the defined controller points.

Figure 10:
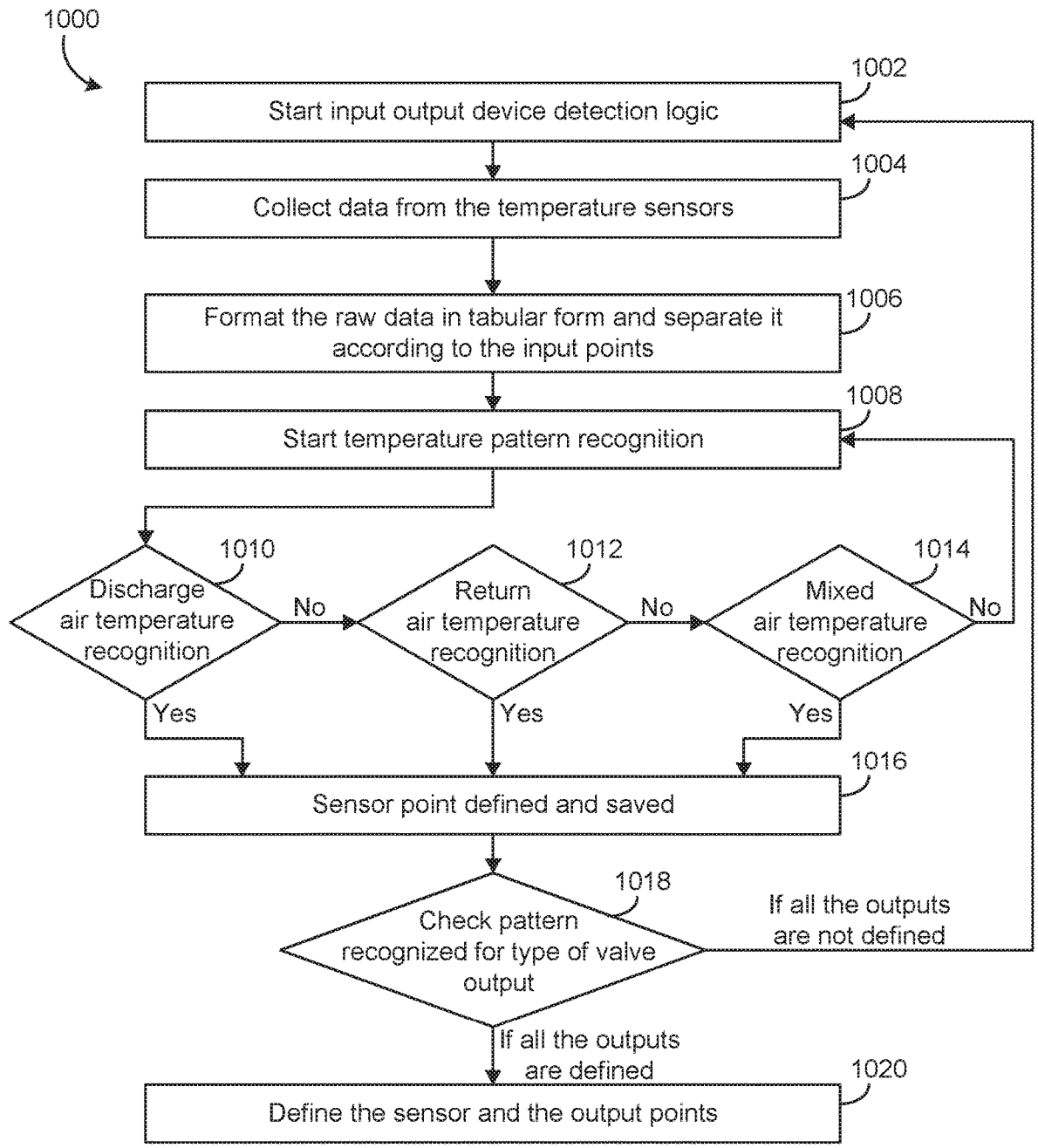
FIG. 10 is a flow diagram of a method of classifying temperature sensors in the smart transducer plug and play system of FIG. 5, according to some embodiments.

Referring now to FIG. 10, a flow diagram of another process 1000 for defining field device locations is shown, according to some embodiments. Process 1000 may be performed by one or more components of plug and play controller system 500 described above with reference to FIG. 5. Specifically, process 1000 may be performed by machine learning engine 510 and pattern recognition engine 512 of cloud service 508 to identify plug and play transducers 504 configured to measure the temperature at different locations of HVAC system 100.

Process 1000 may begin with step 1002, in which machine learning engine 510 initializes input output device (e.g., plug and play transducers 504) detection logic. In some embodiments, step 1002 may include machine learning engine 510 receiving input output device identification information contained in a TEDS transmitted from controller 502. At step 1004, machine learning engine 510 may direct controller 502 to collect sample data from the connected input output devices (e.g., plug and play transducers 504). For example, machine learning engine 510 may instruct controller 502 to operate certain connected HVAC devices (e.g., AHU 106, cooling coil 334, heating coil 336) while data is collected from plug and play transducers 504.

At step 1006, machine learning engine 510 is shown to format the raw sample data from plug and play transducer 504 and separate it according to the input points. For example, machine learning engine 510 may store the data from each of the plug and play transducer 504 in separate files, or in separate locations (e.g., different columns) within the same file. At step 1008, machine learning engine 510 may start the temperature recognition process. In some embodiments, step 1008 is identical or substantially similar to step 810 of process 800, and step 918 of process 900.

Continuing with step 1010 of the process 1000, machine learning engine 510 may determine whether the sample data from one of the plug and play transducers 504 indicates that the transducer 504 is located in a discharge air stream. For example, machine learning engine 510 may compare the sample data from transducer 504 with idealized test data from an transducer located in a dischange air stream. In some embodiments, the test data is stored within pattern recognition engine 512 and the comparison between test and sample data may include regression techniques. If machine learning engine 510 determines that the transducer 504 is located in the discharge air stream, process 1000 may proceed to step 1016. However, if machine learning engine 510 determines that transducer 504 is not located in the discharge air stream, process 1000 may proceed to step 1012.

At step 1012, machine learning engine 510 may determine whether the sample data from the selected play and play transducer 504 indicates that the transducer 504 is located in a return air stream. For example, machine learning engine 510 may compare the sample data from transducer 504 with idealized test data from a transducer located in a return air stream. If machine learning engine 510 determines that the transducer 504 is located in the return air stream, process 1000 may proceed to step 1016. However, if machine learning engine 510 determines that transducer 504 is not located in the return air stream, process 1000 may proceed to step 1014.

Still referring to FIG. 10, at step 1014, machine learning engine 510 may determine whether the sample data from the selected plug and play transducer 504 indicates that the transducer 504 is located in a mixed air stream. For example, machine learning engine 510 may compare the sample data from transducer 504 with idealized test data from a transducer located in a mixed air stream. If machine learning engine 510 determines that the transducer 504 is located in the mixed air stream, process 1000 may proceed to step 1016. However, if machine learning engine 510 determines that transducer 504 is not located in the mixed air stream, process 1000 may revert to step 1008 and machine learning engine 510 may re-start the temperature pattern recognition process. For example, in some embodiments, additional time series sample data received from the transducer 504 may permit machine learning engine 510 and/or pattern recognition engine 512 to determine that transducer 504 is located in the discharge, return, or mixed air stream. In some embodiments, steps 1008-1014 may be repeated for each plug and play transducer 504 within plug and play system 500.

At step 1016, each sensor point (e.g., transducer 504) is defined and machine learning engine 510 may store the definitions in a file. In some embodiments, the file is stored within machine learning engine 510. In other embodiments, the file is stored elsewhere within cloud service 508. Continuing with step 1018, machine learning engine 1018 may proceed to define the locations of output devices (e.g., valve outputs, smart actuators 506). Since each of the locations of transducers 504 are defined, machine learning engine 510 may send signals instructing controller 502 to operate the output devices in accordance with certain known transducer response characteristics. For example, a temperature transducer located downstream of a valve output may output temperature measurement data that, when plotted, forms predictable shapes in response to certain operations of the valve. Based on the primitive shapes contained within the response data from transducers 504 (see FIGS. 11-12B below), machine learning engine 510 and/or pattern recognition engine 512 may complete a pattern recognition process to define the locations of each output device.

In some embodiments, the location of each output device is determined in a sequential manner. For example, after machine learning engine 1018 completes a pattern recognition process to define a selected output device, machine learning engine 510 may determine whether any other output devices connected to plug and play system 500 remain undefined. If all of the output devices are not defined, process 100 may revert to step 1002. However, if all of the output devices are defined, process 1000 may conclude with step 1020, in which each of the sensors and output points are defined.

Figure 11:
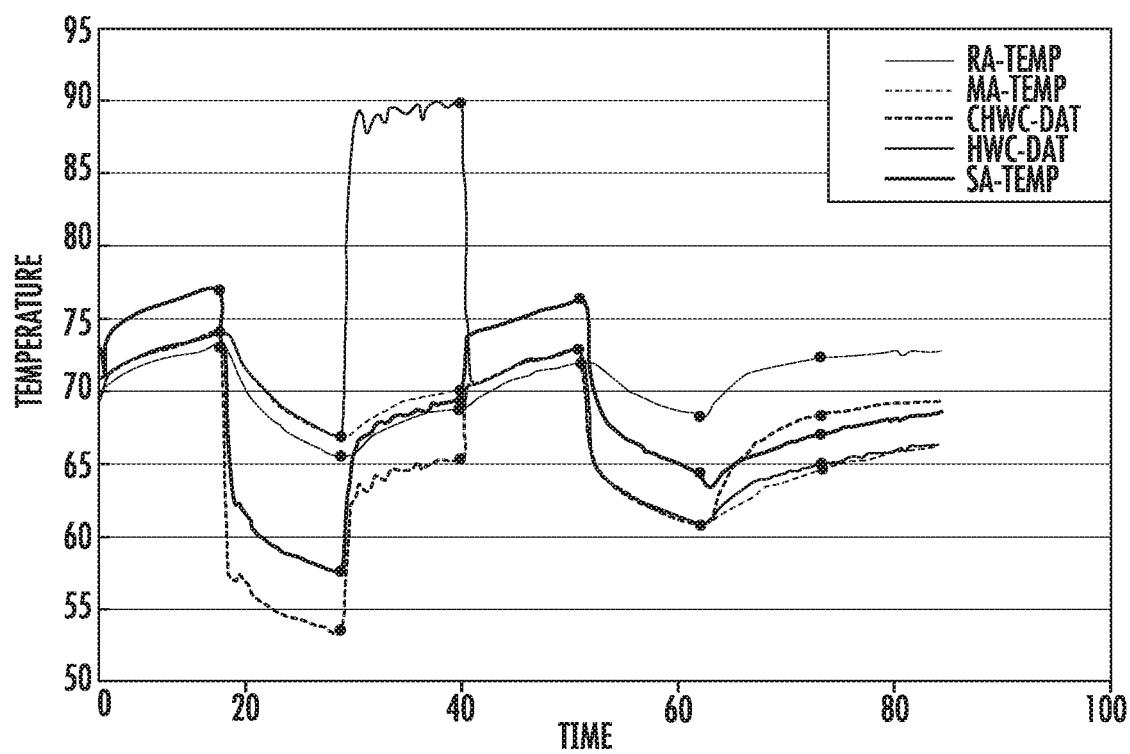
FIG. 11 is a diagram of a field device feature recognition plot, according to some embodiments.
Figure 12A:
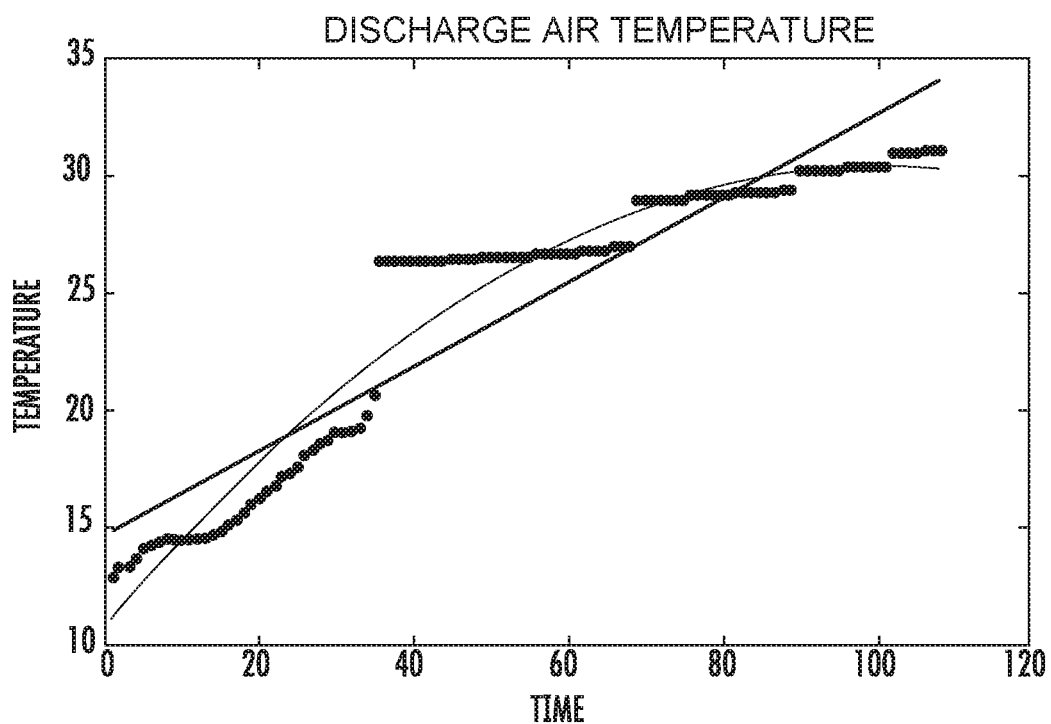
FIG. 12A is diagram of a feature recognition plot for a discharge air temperature sensor, according to some embodiments.
Figure 12B:
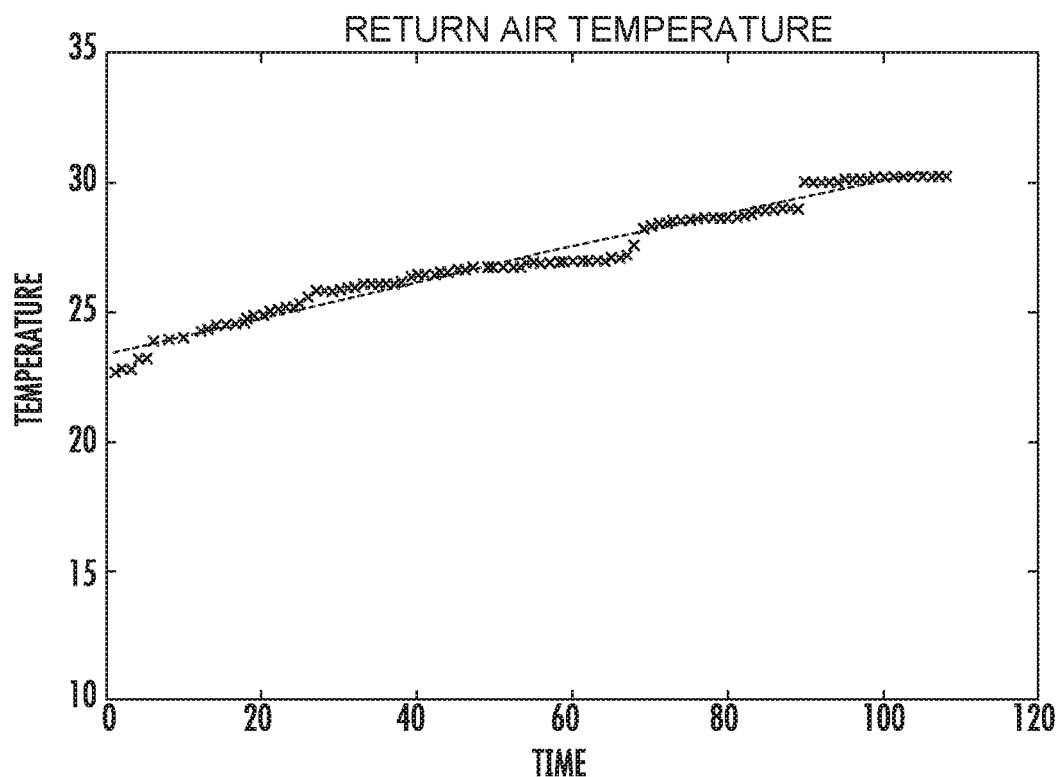
FIG. 12B is a diagram of a feature recognition plot for a return air temperature sensor, according to some embodiments.

Turning now to FIGS. 11-12B, temperature plots that may be used by the machine learning engine 510 and the pattern recognition engine 512 during the pattern recognition processes of FIGS. 8-10 are shown, according to some embodiments. Although FIGS. 11-12B depict temperature plots (i.e., temperature measurement data from the transducers represented on the y-axis as a function of time represented on the x-axis), similar plots may be generated for any environmental condition measured by plug and play transducers 504 (e.g., pressure, humidity). FIG. 11 depicts a temperature plot of data received from several transducers 504 in response to a sequence of operations performed by connected HVAC devices. For example, in various embodiments, the temperature plot may include test or sample data from transducers 504 in such locations within HVAC system 100 as the return air stream (indicated by "RA-TEMP"), mixed air stream ("MA-TEMP"), the chilled water coil discharge ("CHWC-DAT"), the hot water coil discharge ("HWC-DAT"), and the supply air stream ("SA-TEMP"). In some embodiments, HVAC system 100 includes each of these locations, and transducers 504 may be installed at each location. In other embodiments, HVAC system 100 includes only some of these locations, and/or transducers 504 may only be installed at some locations.

In some embodiments, the input output device (i.e., field device) identification process performed by machine learning engine 510 and/or pattern recognition engine 512 includes a pattern segmentation process. The pattern segmentation process may include separating the plots into time series pattern segments and detecting primitive shape categories within those time series pattern segments. For example, in some embodiments, the primitive shape categories may include linear patterns, exponential patterns, step patterns, peak patterns, and triangle patterns. By separating the plots into primitive shape categories, the primitive shape categories may be utilized to determine the locations of connected field devices, as described in further detail below with reference to FIG. 13.

FIGS. 12A and 12B depict, respectively, the responses of transducers 504 located in a discharge air stream and a return air stream as the output of a cooling coil (e.g., cooling coil 334) is modulated by the controller 502. In various embodiments, FIGS. 12A and 12B may be representative of idealized test data used for pattern recognition purposes that is stored within pattern recognition engine 512 or machine learning engine 510. In other embodiments, FIGS. 12A and 12B may represent sample data received from plug and play transducers 504. As shown, the discharge air temperature data of FIG. 12A is comprised of the primitive categories of a linear pattern and multiple step patterns. Similarly, the return air temperature data of FIG. 12B is also comprised of a linear pattern and multiple step patterns, although the linear portion of the return air temperature data extends for a longer time period than that of the discharge air temperature data. Based on the known sequence of operations of the connected HVAC devices (e.g., operating a fan at a known speed, activating a heating coil), it is possible to identify the locations of the transducers 504

Figure 13:
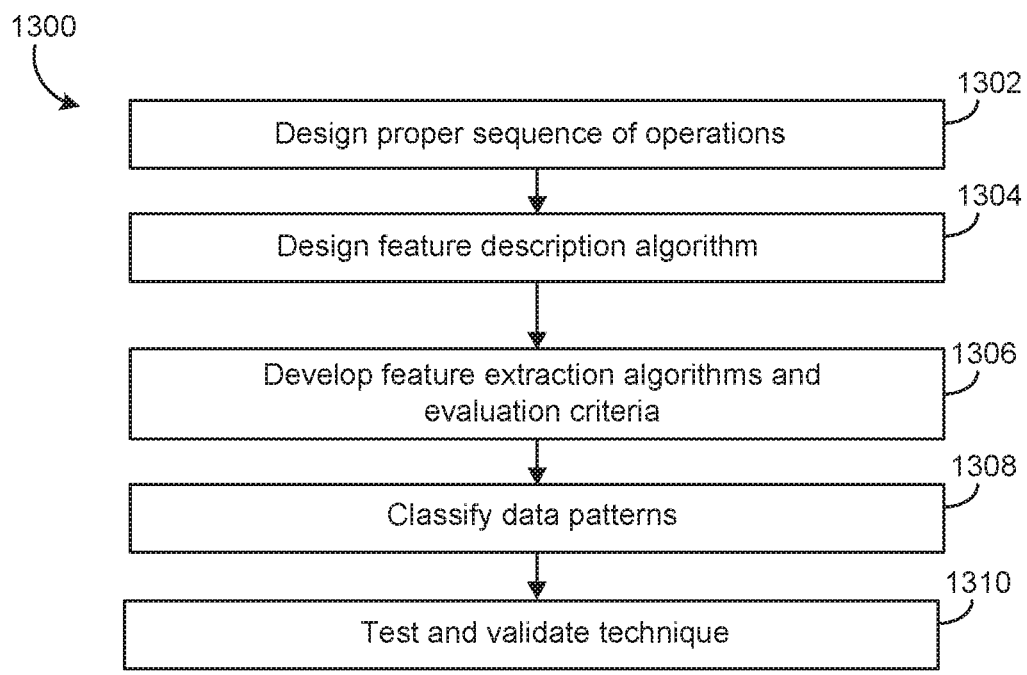
FIG. 13 is a flow diagram of a method of provisioning a machine learning engine in the smart transducer plug and play system of FIG. 5, according to some embodiments.

Referring now to FIG. 13, a flowchart of a process 1300 for provisioning the machine learning engine 510 of cloud service 508 is shown, according to some embodiments. Process 1300 may prepare machine learning engine 510 to perform processes 800-1000, described above with reference to FIGS. 8-10. In various embodiments, process 1300 may be performed manually by an operator of cloud service 508, and/or automatically by components of cloud service 508. The process below will be described exclusively with reference to the recognition of temperature transducers, although an identical or substantially similar process may be utilized for the recognition of other types of field device (e.g., pressure transducers, humidity transducers).

Process 1300 is shown to commence with step 1302, which may include designing a proper sequence of operating connected HVAC devices (e.g., AHU 106, cooling coil 334, heating coil 336, supply fans, return fans, outside air dampers, return air dampers, exhaust air dampers, cooling coil valves, heating coil valves, chilled water pumps, heating water pumps). The sequence of operations may be used to generate idealized test temperature patterns used to compare with sample data received from the smart transducers 504 and determine the logical locations of the smart transducers.

Step 1304 may include designing a feature description algorithm. In some embodiments, the feature description algorithm may be utilized to categorize, organize, and model data patterns into string or graph representations. For example, expected temperature patterns may be analyzed and portions of the expected temperature patterns may be classified into the primitive categories described above with reference to FIGS. 11-12B (e.g., linear patterns, exponential patterns, step patterns, peak patterns, triangle patterns). However, in order for the patterns to be classified into primitive categories, the primitive categories must first be defined. This definition may occur at step 1304. Continuing with step 1306, feature extraction algorithms and evaluation criteria may be developed to extract the primitive categories from sample and/or test data. For example, the extraction algorithm may determine how data from transducers 504 is segmented or separated into multiple primitive categories.

Process 1300 is shown to continue with step 1308, which may include classifying patterns modeled by the string or graph representations. For example, step 1308 may include determining that a transducer 504 in a particular location (e.g., the return air stream, the chilled water coil discharge) exhibits a particular pattern of several primitive data categories in response to a particular sequence of HVAC device operations. In various embodiments, classifying patterns may include using parsing or graph pattern matching methods. Process 1300 may conclude with step 1310, which may include testing and validating the description, evaluation, and classification techniques developed in steps 1304-1308. In some embodiments, step 1310 may include designing tests to assess the accuracy of the feature extraction algorithms and the evaluation criteria, implementing the tests, and collecting sample data patterns for supervised learning and recognition.

Configuration of Exemplary Embodiments

The construction and arrangement of the systems and methods as shown in the various exemplary embodiments are illustrative only. Although only a few embodiments have been described in detail in this disclosure, many modifications are possible. For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for an HVAC device of a building management system comprising a communications bus, a plurality of field devices connected to the communications bus; and a cloud service comprising a machine learning engine, the controller comprising:
   an interface configured to be communicably connected to the communications bus; and
   a processor configured to:
      transmit messages through the communications bus to the plurality of field devices connected to the communications bus;
      compile a list of the field devices connected to the communications bus;
      receive sample data from the field devices;
      transmit the sample data from the field devices to the cloud service; and
      receive at least one identifying characteristic for each of the field devices from the cloud service.

2. The controller of claim 1, wherein the processor is configured to select a control logic file for the HVAC device based at least in part on the identifying characteristic.

3. The controller of claim 1, wherein the plurality of field devices includes at least one temperature sensor, pressure sensor, or humidity sensor and wherein the sample data comprises at least one of temperature data, pressure data, and humidity data.

4. The controller of claim 1, wherein the plurality of field devices communicate with the controller via an IEEE 1451.4 TEDS standard.

5. The controller of claim 1, wherein the identifying characteristic comprises field device location within a building management system.

6. The controller of claim 1, wherein the HVAC device is at least one of a fan coil unit, a roof top unit, and an air handling unit.

7. The controller of claim 1, wherein the controller communicated with the cloud service via wireless communications.

8. The controller of claim 1, wherein the controller is further configured to modulate an operation of at least one of a cooling coil and a heating coil in response to a message from the cloud service.

9. The controller of claim 1, wherein the controller is further configured to modulate an operation of a fan in response to a message from the cloud service.

10. A method for performing cloud services using a machine learning engine, the method comprising:
    transmitting messages through a communications bus to a plurality of field devices connected to the communications bus;
    compiling a list of the plurality of field devices connected to the communications bus;
    receiving sample data from the field devices;
    transmitting the sample data from the field devices to a cloud service; and
    receiving at least one identifying characteristic for each of the field devices from the cloud service.

11. The method of claim 10, wherein the method further comprises selecting a control logic file for the HVAC device based at least in part on the identifying characteristic.

12. The method of claim 10, wherein the plurality of field devices includes at least one temperature sensor, pressure sensor, or humidity sensor and wherein the sample data comprises at least one of temperature data, pressure data, and humidity data.

13. The method of claim 10, wherein the plurality of field devices communicate with a controller via an IEEE 1451.4 TEDS standard.

14. The method of claim 10, wherein the identifying characteristic comprises field device location within a building management system.

15. The method of claim 10, wherein the HVAC device is at least one of a fan coil unit, a roof top unit, and an air handling unit.

16. The method of claim 10, wherein the method further comprises modulating an operation of at least one of a cooling coil and a heating coil in response to a message from the cloud service.

17. The method of claim 10, wherein the method further comprises modulating an operation of a fan in response to a message from the cloud service.

18. A non-transitory computer-readable storage media having computer-executable instructions stored thereon that, when executed by one or more processors, cause the one or more processors to perform operations comprising:

transmitting messages through a communications bus to a plurality of field devices connected to the communications bus;

compiling a list of the plurality of field devices connected to the communications bus;

receiving sample data from the field devices;

transmitting the sample data from the field devices to a cloud service; and receiving at least one identifying characteristic for each of the field devices from the cloud service.

19. The media of claim 18, wherein the one or more processors are further configured to select a control logic file for the HVAC device based at least in part on the identifying characteristic.

20. The media of claim 18, wherein the plurality of field devices includes at least one temperature sensor, pressure sensor, or humidity sensor and wherein the sample data comprises at least one of temperature data, pressure data, and humidity data.

* * * * *